United States Patent [19]
DeSimone et al.

[11] Patent Number: 5,977,292
[45] Date of Patent: Nov. 2, 1999

[54] PROCESS FOR THE PREPARATION OF POLYESTERS IN CARBON DIOXIDE

[75] Inventors: Joseph M. DeSimone, Chapel Hill, N.C.; Gerhard Maier, Munich, Germany

[73] Assignee: The University of North Carolina at Chapel Hill, Chapel Hill, N.C.

[21] Appl. No.: 08/903,269

[22] Filed: Jul. 25, 1997

Related U.S. Application Data

[63] Continuation of application No. 08/471,500, Jun. 6, 1995, abandoned.

[51] Int. Cl.$^6$ ................................................ C08G 63/985
[52] U.S. Cl. .................. 528/279; 528/285; 528/308.8
[58] Field of Search ........................ 528/274, 308.8, 528/302, 305, 308, 279, 285

[56] References Cited

U.S. PATENT DOCUMENTS

| | | |
|---|---|---|
| 3,294,772 | 12/1966 | Cottle . |
| 3,522,228 | 7/1970 | Fukui et al. . |
| 3,668,139 | 6/1972 | Daniels ................................. 528/274 |
| 3,689,462 | 9/1972 | Maximovich et al. ............ 260/77.5 D |
| 3,891,605 | 6/1975 | Larsen . |
| 4,136,089 | 1/1979 | Bier et al. ............................... 528/309 |
| 4,238,593 | 12/1980 | Duh ........................................ 528/272 |
| 4,452,968 | 6/1984 | Bolon et al. ........................... 528/271 |
| 4,748,220 | 5/1988 | Hartmann et al. ...................... 526/89 |
| 4,754,017 | 6/1988 | Leitz et al. ............................. 528/371 |
| 4,764,323 | 8/1988 | Al Ghatta ................................ 264/85 |
| 4,791,929 | 12/1988 | Jarrett et al. ......................... 128/335.5 |
| 4,920,203 | 4/1990 | Tang et al. ............................. 525/409 |
| 4,990,595 | 2/1991 | Traechkner et al. ................... 528/483 |
| 5,015,724 | 5/1991 | Kawabe ................................. 528/272 |
| 5,049,647 | 9/1991 | Al-Ghatta .............................. 528/272 |
| 5,073,203 | 12/1991 | Al-Ghatta ............................... 134/11 |
| 5,256,764 | 10/1993 | Tang et al. ............................. 528/370 |
| 5,312,882 | 5/1994 | DeSimone et al. ...................... 526/201 |
| 5,382,623 | 1/1995 | DeSimone et al. ...................... 524/557 |
| 5,412,068 | 5/1995 | Tang et al. ............................. 528/370 |
| 5,434,239 | 7/1995 | Bhatia . |
| 5,478,910 | 12/1995 | Russell . |
| 5,506,331 | 4/1996 | Nagao . |
| 5,625,027 | 4/1997 | Kuze et al. ............................. 528/196 |

FOREIGN PATENT DOCUMENTS

| | | |
|---|---|---|
| 0 300 981 A1 | 1/1989 | European Pat. Off. . |
| 0356815 | 3/1990 | European Pat. Off. ........ C08G 63/88 |
| 0 222 714 B1 | 3/1992 | European Pat. Off. . |
| 0 269 583 B1 | 6/1993 | European Pat. Off. . |
| 3537 455 A1 | 4/1987 | Germany . |
| 3-177407 | 8/1991 | Japan . |
| 1172713 | 5/1967 | United Kingdom . |
| 1 523 300 | 8/1978 | United Kingdom ........... C08G 67/00 |
| WO 93/20116 | 10/1993 | WIPO ............................. C08F 14/18 |

OTHER PUBLICATIONS

Garg et al, "Thermodynamics of Polymer Melts Swollen With Supercritical Gases", *Macvomolecules*, 1994, vol. 27, pp. 5643–5653.

Condo et al., "Glass Transitions of Polymers with Compressed Fluid Diluents: Type II and III Behavior", *Macromolecules*, 1994, vol. 27, pp. 365–371.

Iyer, V.S., et al., "Solid–Sate polymerization of Poly(aryl carbonate)s: A Facile Route to High Molecular Weight Polycarbonates", *Macromolecules*, 1993, vol. 26, pp. 1186–1187.

Radhakrishnan, S., et al., "Structure and Morphology of Polycarbonate Synthesized by Solid State Polycondensation", *Polymer*, 1994, vol. 35, pp. 3789–3791.

E. Beckman et al.; Crystallization of Bisphenol a Polycarbonate Induced by Supercritical Carbon Dioxide, *J. of Polymer Science: Part B: Polymer Physics* 25:1511–1517 (1987).

Shuichi Oi, et al., "Direct synthesis of polycarbonates from $CO_2$, diols and dihalides", *Macromolecular: Rapid Communications*, Feb. 1994, vol. 15, No. 2, pp. 133–137.

DeSimone et al., Dispersion Polymerizations In Supercritical Carbon Dioxide, Science, 265:356–359 (Jul. 15, 1994).

H. Mark et al., Polyesters, The Encyclopedia of Polymer Science and Engineering, Eds., 2d ed., 12:1–60 (1985).

M. McHugh et al., Supercritical Fluid Chromatography Analysis Of Polystyrene, Excerpts from Supercritical Fluid Extraction, EDS., pp. 147–159 (1986).

Shaffer et al., Chain Polymerizations In Inert Near– and Supercritical Fluids, TRIP 3, No. 5:146–153, (May 1995).

Varadarajan, Free Radical Polymerization In Supercritical Fluid Solvents, Doctoral Thesis Digest, pp. 2–34, Nov. 29, 1990.

Scholsky, Supercritical Polymerization Reactions, pp. 685–686. (1985).

V. Krukonis et al., Supercritical Fluid Chromatography Analysis of Polystyrene, Polymer Fractionation, pp. 146–147, 156–159, 244–245, 248–249. (1986).

*Primary Examiner*—Christopher Henderson
*Attorney, Agent, or Firm*—Myers Bigel Sibley & Sajovec

[57] ABSTRACT

The present invention provides processes for preparing polyesters. The processes include (a) providing a polymerization medium comprising carbon dioxide, (b) contacting a monomer capable of forming a polyester polymer with the polymerization medium, and (c) polymerizing the monomer in the polymerization medium. The processes of the present invention include preparing polyesters by direct esterification polymerization, transesterification polymerization, melt acidolysis polymerization and acid halide polymerization. As a further aspect, the present invention provides a method of separating the polyester produced from the polymerization medium. Polyester polymers prepared according to the methods of the present invention are also provided.

28 Claims, No Drawings

PROCESS FOR THE PREPARATION OF POLYESTERS IN CARBON DIOXIDE

This application is a continuation of application Ser. No. 08/471,500, filed Jun. 6, 1995 now abandoned.

FIELD OF THE INVENTION

The present invention relates to polyester polymers and more particularly to methods of preparing polyester polymers.

BACKGROUND OF THE INVENTION

Linear polyester polymers are widely known and have demonstrated utility in an ever-increasing number of applications. The most widely recognized polyester, poly (ethylene terephthalate) has been long established as the basis of fibers, films, molding plastics, and containers for liquids. Poly(butylene terephthalate) is also recognized as a molding plastic and molecular component of polyetherester thermoplastic block copolymer for elastomers. The alicyclic ring-containing polyester and copolymers thereof are also recognized for their fiber and plastics applications.

Conventional methods of preparing polyesters employ organic polymerization medium such as hydrocarbons and chlorinated hydrocarbons for solubilizing the monomers for polymerization. As organic solvents become a source of increasing environmental concern, there is a need for a method of preparing polyester which avoids the use of these organic solvents.

Conventional polyester polymerization techniques also possess the disadvantage of requiring vacuum separation techniques for the removal of condensates produced during polymerization. These vacuum separation techniques are typically expensive.

There remains a need in the art for a method of making polyester polymers which avoids the use of organic solvents and the need for expensive vacuum separation techniques for the recovery of condensates. In addition, there is a need in the art for a method of preparing polyester polymers with controlled morphologies and which permits the relatively easy separation of the polymer from the polymerization medium.

SUMMARY OF THE INVENTION

As a first aspect, the present invention provides processes for preparing polyester. The processes include (a) providing a polymerization medium comprising carbon dioxide, (b) contacting a monomer capable of forming a polyester polymer with the polymerization medium, and (c) polymerizing the monomer in the polymerization medium. Typically, monomers which are capable of forming polyesters include hydroxycarboxylic acid monomers, and mixtures of diacid monomers and diol monomers. The processes of the present invention include preparing polyesters by direct esterification polymerization, transesterification polymerization, melt acidolysis polymerization and acid halide polymerization. As a further aspect, the present invention provides a method of separating the polyester produced from the polymerization medium.

As a second aspect, the present invention provides a polyester polymer prepared in a carbon dioxide polymerization medium.

As a third aspect, the present invention provides a polymerization reaction mixture useful for the preparation of polyester polymers. The reaction mixture includes a monomer capable of forming a polyester polymer, and a carbon dioxide polymerization medium. Additional additives and reactants may also be included, as explained more fully herein below.

As a fourth aspect, the present invention provides mixtures produced by the polymerization of monomers capable of forming polyester polymers. The reaction mixture may be formed by the preparation of polyester via direct esterification polymerization, transesterification polymerization, melt acidolysis polymerization or acid halide polymerization.

Carbon dioxide has been employed as a reaction medium in an increasing number of polymerization processes. For example, U.S. Pat. No. 3,522,228 to Fukui et al., proposes the polymerization of vinyl monomers in liquid carbon dioxide using hydrocarbon polymerization initiators. U.S. Pat. No. 5,328,972 to Dada et al., proposes a process for preparing low molecular weight polymers in supercritical carbon dioxide. U.S. Pat. No. 3,471,463 to Kagiya et al., proposes the polymerization of ethylene in carbon dioxide, using a radical initiator compound. U.S. Pat. No. 5,312,882 and 5,382,623 to DeSimone et al., disclose the heterogeneous polymerization of water-insoluble polymers in carbon dioxide. PCT Publication No. WO 93/20116 to the University of North Carolina at Chapel Hill discloses processes for making fluoropolymers which include solubilizing a fluoromonomer in a solvent comprising carbon dioxide. The use of carbon dioxide in such systems is advantageous in that it provides an inexpensive solvent system, which is environmentally compatible, and easily separable from the polymers produced. However, none of the foregoing references discuss the use of carbon dioxide as a polymerization medium for the preparation of polyesters. Inasmuch as polyester polymers and copolymers are of such commercial importance, there remains a need in the art for a process for preparing polyesters which utilizes inexpensive, environmentally compatible polymerization medium.

The foregoing and other aspects of the present invention are explained more fully in the detailed description set forth below.

DETAILED DESCRIPTION OF THE INVENTION

As used herein the term "polyester" has its conventional meaning in the art. See Polyesters, *The Encyclopedia of Polymer Science and Engineering*, H. Mark, et al., Eds., 2d ed., 12:1–60 (1985). Generally, polyesters are heterochain polymers characterized by the presence of carboxylate ester groups in the repeating units of the backbone. The term "supercritical," as used herein, has its conventional meaning in the art. A supercritical fluid (SCF) is a substance above its critical temperature and critical pressure (or "critical point"). Compressing a gas normally causes a phase separation and the appearance of a separate liquid phase. However, if the fluid is in a supercritical state, compression will only result in density increases; no liquid phase will be formed. The critical temperature of carbon dioxide is about 31° C.

The monomers useful in the processes of the present invention include those monomers conventionally known in the art for the preparation of polyester polymers (i.e., "polyester forming monomers"). For example, one suitable monomer useful in the processes of the present invention includes hydroxycarboxylic acids. As used herein the term "hydroxycarboxylic acid" refers to monomers having at least one carboxylic acid group and at least one hydroxy group but which may also include any reasonable number of other known substituents which do not interfere with the polymerization of the monomer. Examples of suitable substituents on the hydroxycarboxylic acid include but are not limited to linear, branched or cyclic, saturated or unsaturated alkyl, linear, branched or cyclic, saturated or unsaturated alkoxy, halo, and the like. Hydroxycarboxylic acids are well known in the art of polyester production, and are capable of producing polyester polymers via self-polycondensation polymerization reactions. Examples of suitable hydroxycarboxylic acids include but are not limited to hydroxybenzoic acid.

As a second example, the monomer useful in the processes of the present invention may be a mixture of dicarboxylic acid monomer, or anhydride derivatives thereof, with diol monomer. As used herein, the term "dicarboxylic acid" refers to monomers having at least two carboxylic acid groups, but which may also include any reasonable number of other known substituents which do not interfere with the polymerization of the monomer. Examples of suitable substituents on the dicarboxylic acid include but are not limited to linear, branched or cyclic, saturated or unsaturated alkyl, linear, branched or cyclic, saturated or unsaturated alkoxy, halo, and the like. The term "diol" as used herein refers to monomers having at least two hydroxy groups. Mixtures of dicarboxylic acids, or anhydride derivatives thereof, with diols are well known in the art of polyester production, and are capable of producing polyester polymers via polycondensation polymerization reactions. Examples of suitable dicarboxylic acids include but are not limited to terephthalic acid, isophthalic acid, naphthalene dicarboxylic acid, 4,4'-biphenyldicarboxylic acid, and adipic acid. Examples of suitable diols include but are not limited to ethylene glycol, bisphenol A, butane diol, neopentyl glycol, cyclohexyldimethanol, hydroquinone, and biphenol.

Derivatives of the foregoing monomers may also advantageously be employed in the methods of the present invention. Suitable derivatives for use in conventional polyester polymerization processes are well known in the art, and include, for example, bis(hydroxyethyl terephthalate). As will be described in detail hereinbelow, these derivatives may be particularly advantageous in certain specific polymerization reactions. These derivatives are intermediates obtained from a primary esterification process, as known to those skilled in the art.

The polyester polymers produced according to the methods of the present invention include polyester homopolymers, or in the embodiment wherein one or more comonomers are employed in combination with the polyester forming monomers, the resulting polyester polymers may be copolymers. The comonomers useful in the methods of the present invention may be any of a wide variety of conventionally employed comonomers for the production of useful copolyesters. Suitable comonomers capable of copolymerizing with the monomers of the present invention include but are not limited to the monomers recited hereinabove.

Copolymers which may be produced according to the processes of the present invention include but are not limited to copolyesters based on:
terephthalic acid/isophthalic acid/ethylene glycol;
terephthalic acid/isophthalic acid/cyclohexyldimethanol;
hydroxybenzoic acid/bisphenol A/terephthalic acid;
hydroquinone/terephthalic acid/hydroxybenzoic acid; and
hydroquinone/terephthalic acid/hydroxybenzoic acid/
  naphthalene dicarboxylic acid.

Generally, there are four types of polycondensation reaction methods by which polyesters may be formed: (1) direct esterification polymerization, (2) transesterification polymerization, (3) melt acidolysis polymerization, and (4) acid halide polymerization. See Polyesters, *The Encyclopedia of Polymer Science and Engineering*, H. Mark, et al., Eds., 2d ed., 12:1–60 (1985), the disclosure of which is incorporated herein by reference in its entirety, for a complete discussion of all four polymerization methods. Briefly, direct esterification involves heating a polyester forming monomer such as a hydroxycarboxylic acid or a mixture of dicarboxylic acid (or anhydride derivative thereof) and diol to a temperature sufficient to effect esterification, thus forming the polyester polymer and by-product water. Typically, the temperature is increased from about 150° C. to an upper limit, which minimizes the risk of thermal degradation during the polymerization period. Polymerization is allowed to proceed for a period of time sufficient to produce a polymer having the desired molecular weight.

As is known in the art, the number-average degree of polymerization of a linear polymer formed from a hydroxycarboxylic acid monomer or from an equimolar mixture of dicarboxylic acid (or anhydride derivative) and diol monomers is given by:

$$\frac{1}{1-p}$$

where p is the extent of reaction. The number average molecular weight ($M_n$) and weight average molecular weight ($M_w$) can be determined as follows:

$$M_n = \frac{M_o}{(1-p)} \quad M_w = \frac{M_o(1+p)}{(1-p)}$$

where $M_o$ is the formula weight of the chemical repeating unit. Values for p of 0.50, 0.90, 0.95, and 0.99 (i.e., 50, 90, 95, and 99 percent conversion of the available reaction groups) then correspond to degrees of polymerization of 2, 10, 20, and 100, respectively. These formulas indicate that a high degree of chemical conversion is needed to obtain high molecular weight polymers and that the main increase in molecular weight occurs during the later stages of the reaction. Since esterification is an equilibrium process, the efficiency of the process is dependent upon the removal of the water by-product from the reaction. To achieve degrees of polymerization of less than about 20 percent conversion, normally the water by-product is sufficiently driven off by the reaction temperature itself, with the assistance of stirring. Higher degrees of polymerization normally require the use of azeotropic entrainment or reduced pressures to press the reaction in the forward direction.

These conversion equations demonstrate that equal concentrations of the reacting groups should be present at all stages of the reaction. Provided that there are no side reactions which cause a loss of functionality, equal concentrations of reacting groups are present in the case of hydroxycarboxylic acids, but in the reaction of dicarboxylic acids (or anhydrides) with diols, the diols are often relatively volatile leading to loses by codistillation with the water by-product and resulting in limitation of the molecular weight of the product. For similar reasons, copolymerization of a dicarboxylic acid with a mixture of diols may result in some loss of the more volatile component of the diol and thus to a displacement of the co-unit ratio for that reactant. Typically, this situation is remedied by employing an excess, e.g., 10–20 mol %, of the diol in the initial condensation stage to compensate for physical loss and to form hydroxyl-ended polyesters whose molecular weights can be developed further by interchain length and the formation of products that are stable toward further condensation in the conditions for later fabrication and use.

Direct esterification reactions are self-catalyzed by the carboxylic acid groups. However, as the reaction progresses, the concentration of the carboxylic acid component decreases. Accordingly, additional polyesterification catalysts may be employed, as will be appreciated by those skilled in the art. As used herein, the term "polyesterification catalyst" refers to catalysts useful in any of the four polycondensation methods for catalyzing the particular method chosen. Naturally, the selection of a particular polyesterification catalyst will be dependent upon the polyesterification method employed and the specific monomer or monomers to be reacted. Suitable polyesterification catalysts for direct esterification polymerization reactions include protonic acids such as sulfuric acid, hydrochloric acid, and p-toluene sulphonic acid; Lewis acids; titanium alkoxides; and dialkyltin(IV)oxides. The polyesterification catalyst is employed in an amount sufficient to catalyze the direct esterification polymerization. Typically, the amount of polyesterification catalyst is between about 2 ppm and about 1000 ppm based on the total weight of the reactants.

As is appreciated by those skilled in the art, the direct esterification reaction is accompanied by ester-ester exchange reactions between molecules at higher temperatures and in the presence of catalysts. In addition, the reaction is also accompanied by alcoholysis or acidolysis reactions of previously formed ester groups by hydroxyl or carboxylic acid chain ends, resulting in the liberation of diol in the alcoholysis reaction and the liberation of a dicarboxylic acid in the acidolysis reaction. Provided that the liberated species are removed from the reaction, these reactions result in the linking of chains and a corresponding increase of molecular weight. Traditionally, the alcoholysis reaction could be driven to the right by working under reduced pressure in order to remove liberated diol from the system and provide an efficient means of obtaining high molecular weight precondensates with hydroxyl groups at both ends of the molecule, thus producing aliphatic polyesters.

In the second method, the transesterification polymerization reaction, the carboxylic acid and/or diol compounds may be replaced by derivatives containing the required structural units, but which possess more desireable physical properties or which permit reaction by mechanisms or conditions different from that between carboxylic acid and hydroxyl groups. Suitable derivative monomers which are capable of undergoing transesterification polymerization are known to those skilled in the art, and include, for example, bis(hydroxyethyl)terephthalate.

According to the transesterification polymerization, homo-and copolyesters of aliphatic or alicyclic diols with aliphatic, alicyclic, aromatic, or heterocyclic dicarboxylic acids are prepared by a two stage process. In the first stage, the dialkyl (e.g., dimethyl) ester of the dicarboxylic acid reacts with an excess of the diol in an ester-exchange or transesterification process liberating an alkanol (e.g., methanol) and forming a bis(hydroxyalkyl)ester. In the second stage, the ester is polycondensed by alcoholysis to form the polyester. A molecule of diol is released for each step of chain growth.

The reaction is typically run under conditions which are designed to drive each reaction stage in the forward direction. Suitable conditions include the removal of the low molecular weight by-product as it is formed. For example, the diol may be employed in a 10–50 mol % excess of the theoretical requirement of the first step in order to force the ester-exchange reaction toward completion. Typically, a mixture of dialkyl ester and diol with a polyesterification catalyst is heated with stirring in an inert atmosphere at about 150–200° C. until the evolution of alkanol is complete. The polymerization is then continued at higher temperatures and under reduced pressures to obtain the polyester. The polyesterification catalyst can be any number of catalysts known to those skilled in the art which are useful for catalyzing the transesterification reaction. Suitable polyesterification catalysts for transesterification polymerization include, for example, weak bases such as carbonates, alkanoates, hydrides, or alkoxides of sodium, lithium, zinc, calcium, magnesium, and titanium; and bimetallic alkoxides such as $NaHTi(OC_4H_9)_6$, $MgTi(OC_4H_9)_6$. The catalysts may be employed in an amount sufficient to catalyze the transesterification polymerization reaction. Typically, the catalyst is employed in an amount of about 0–0.5% based on the total weight of the reactants.

The temperature for the second stage is determined by the crystalline melting temperature of the product. The product must to be maintained in a molten state. Typically, a suitable temperature is between about 230 and 285° C. The viscosity of the reaction mixture increases substantially as the monomers are converted. The polymerization is carried out for a period of time sufficient to obtain a viscosity measurement which corresponds to the desired molecular weight. The necessary reaction time is typically between about 1 and about 12 hours. The melt polycondensation reaction can be interrupted at an intermediate stage and the product, after solidification and comminution, polymerizes further by heating in vacuo or in a current of inert gas at a temperature where the chains have some mobility and the catalyst is active, but where the polymer is thermally stable.

The third polymerization method is the melt acidolysis polymerization method. This method involves the transacylation of bisphenols to polyester. For example, an alkanoic diester of the bisphenol, e.g., the diacetate, is heated with dicarboxylic acid liberating a volatile alkanoic acid, most of which is removed in an initial stage at about 200° C. The reaction then is completed at higher temperatures and under reduced pressures. Although it is not required, a polyesterification catalyst may be added to the reaction to reduce the temperatures and pressures required for the polymerization. Suitable polyesterification catalysts for melt acidolysis polymerization reactions are known to those skilled in the art, and include for example, metal acetates such as manganese acetate. The polyesterification catalyst is typically employed in an amount sufficient to catalyze the melt acidolysis polymerization. Typically, the amount of polyesterification catalyst employed is between about 0 and about 5 percent based on the total weight of the reactants.

The melt acidolysis polymerization method is useful for the preparation of liquid-crystal polymers (LCPs). These polyester polymers are based on fully aromatic monomers and are prepared by an ester exchange reaction between acetoxyaryl groups and carboxylic acid groups with the elimination of acetic acid at a temperature above the crystalline melting point ($T_m$) of the polymer produced. The temperature of the reaction will depend upon the particular monomers employed, but is typically between about 100° C. and about 400° C. The upper limit of the molecular weight of the polymers prepared by melt acidolysis polymerization, therefore, is determined by the ability to extrude the polymer from a melt autoclave. As the crystalline melting point of the polymer exceeds 300° C., this factor becomes more significant. A conventional approach to increasing molecular weight in light of this factor involves the preparation of low-molecular-weight prepolymers by melt acidolysis followed by a subsequent solid-phase polymerization to achieve a polyester of the desired molecular weight. A second conventional approach to increasing molecular weight involves the preparation of high-melting liquid-crystal polymers in an inert heat transfer medium where the temperature of the stirred polymerization mixture is raised slowly over a matter of hours or days, presumably to ensure that the temperature of the reaction slurry remains below the melting temperature of the polymer as the molecular weight increases.

The fourth method of preparing polyester, the acid-halide polymerization method, involves the acylation of the diol with bis(carbonyl halide). Acylation may proceed by either of two routes. In the first route, a bisphenol or glycol that is thermally stable is heated with the diacid halide (e.g., diacid chloride) in a melt or in the polymerization medium. According to previously known methods, the bisphenol or glycol was heated with the diacid halide in a high boiling inert organic medium such as a hydrocarbon or chlorinated hydrocarbon. The temperature of the reaction is typically between about 0° C. and about 300° C. Hydrogen halide (e.g., chloride) is evolved and the polyester is formed directly, often precipitating as the reaction proceeds. The second approach involves the use of an acceptor for liberated hydrogen halide and is operable at ambient or only moderately elevated temperatures of between about 0° C. and about 150° C. Although a catalyst for the reaction is not required, a polyesterification catalyst may be employed, as will be appreciated by those skilled in the art. Suitable polyesterification catalysts for the acid halide polymerization method include known phase-transfer catalysts such as tetraalkylammonium halides, and the like. The polyesterification catalyst is employed in an amount sufficient to catalyze the acid-halide polymerization reaction. Typically, the polyesterification catalyst is employed in an amount of between about 0 and about 5 percent based on the total weight of the reactants.

The processes of the invention are carried out in a polymerization medium comprising carbon dioxide. The carbon dioxide may be in a gaseous, liquid or supercritical state. The polymerization medium may also include one or more cosolvents. Illustrative cosolvents include but are not limited to, $C_2$–$C_8$ alkanes, $C_2$–$C_8$ alkenes, $C_2$–$C_8$ ethers, methylene chloride, toluene, cyclohexane, methylethyl ketone, acetone, tetrahydrofuran, perfluorocarbons such as perfluorohexane, and hydrofluorocarbons. It may be desirable for the cosolvent to be capable of solubilizing the polyesterification catalyst such that the catalyst may be provided to the reaction in the solubilized form. The catalyst may be added in neat form, as a solution in carbon dioxide, or it may conveniently be added as a solution in a cosolvent.

The polymerization reaction mixture may include other additives and reactants known to those skilled in the art. For example in one preferred embodiment, the process of the invention includes the addition of surfactant for stabilizing the monomer and polymer in the polymerization medium. The surfactant should be one that is surface active in carbon dioxide and thus partitions itself at the carbon dioxide-monomer interface. Suitable surfactants are described in detail in U.S. Pat. No. 5,312,882 to DeSimone et al., the disclosure of which is incorporated herein by reference in its entirety. Such a surfactant should lower the interfacial tension between the carbon dioxide polymerization medium and the polymer, and thus create a dispersed phase. The surfactant is generally present in the reaction mixture in a concentration of from about 0.001 up to about 30 percent by weight. The surfactants can be nonreactive in the polymerization or can react with and thereby be included with the forming polymer. See, e.g., U.S. Pat. Nos. 4,592,933 and 4,429,666 for exemplary reactive surfactants.

The surfactant should contain a segment that is soluble or interfacially active in carbon dioxide ("$CO_2$-philic"). Exemplary $CO_2$-philic segments include a fluorine-containing segment, such as can be found in fluoropolymers or copolymers of fluoropolymers, or a siloxane-containing segment, such as can be found in siloxane polymers or copolymers of siloxane polymers. As used herein, a "fluoropolymer" has its conventional meaning in the art. Exemplary fluoropolymers are those formed from: fluoroacrylate monomers such as 2-(N-ethylperfluorooctanesulfonamido) ethyl acrylate ("EtFOSEA"), 2-(N-ethylperfluorooctanesulfonamido) ethyl methacrylate ("EtFOSEMA"), 2-(N-methylperfluorooctanesulfonamido) ethyl acrylate ("MeFOSEA"), 2-(N-methylperfluorooctanesulfonamido) ethyl methacrylate ("MeFOSEMA"), 1,1-Dihydroperfluorooctyl acrylate ("FOA"), and 1,1-Dihydroperfluorooctyl acrylate ("FOMA"); fluoroolefin monomers such as tetrafluoroethylene, fluorostyrene monomers such as a-fluorostyrene, β-fluorostyrene, α, β-difluorostyrenes, β,β-difluorostyrenes, α,β,β-trifluorostyrenes, α-trifluoromethylstyrenes, 2,4, 6-Tris(-trifluoromethyl)styrene, 2,3,4,5,6-pentafluorostyrene, 2,3,4, 5,6-pentafluoro-α-methylstyrene, and 2,3,4,5,6-pentafluoro-β-methylstyrene; fluoroalkylene oxide monomers such as perfluoropropylene oxide and perfluorocyclohexene oxide; fluorinated vinyl alkyl ether monomers; and the copolymers thereof with suitable comonomers, wherein the comonomers are fluorinated or unfluorinated. Exemplary siloxane-containing compounds include alkyl, fluoroalkyl, and chloroalkyl siloxanes.

More preferably, the surfactant comprises a "$CO_2$-phobic" group along with a $CO_2$-soluble group, such as a fluoropolymer. The $CO_2$-phobic group may be a hydrophobic group, such as a polystyrene group, or a hydrophillic group such as carboxylic acid. Such copolymers can take many forms; exemplary forms are graft copolymers, random copolymers, and block copolymers. For example, one suitable copolymer is a copolymer of FOA and acrylic acid.

Other suitable surfactants that are surface active in carbon dioxide include

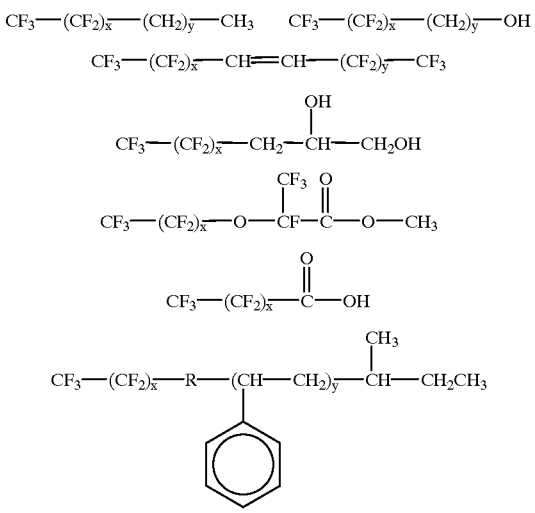

where x=1–30 and y=1 to 30. The x and y values are chosen to adjust the balance between "$CO_2$-philic" and "$CO_2$-phobic" to tailor the surface activity of the reagents.

Exemplary silicone-containing surfactants (i.e., siloxane polymers or copolymers) include

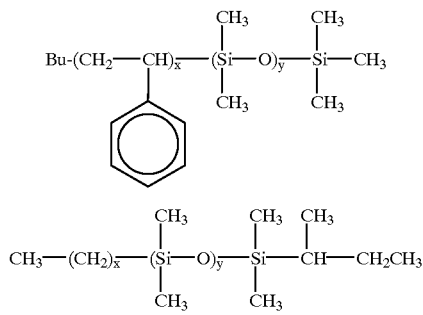

wherein x and y are varied to adjust to "$CO_2$-philic" and "$CO_2$-phobic" balance.

Other additives may also be incorporated into the processes of the present invention. For example, according to another preferred embodiment, the processes of the present invention are carried out in the presence of a crosslinking (or "branching") agent. Suitable crosslinking agents for the preparation of crosslinked polyesters and copolyesters are well known in the art. For example, multifunctional hydroxy compounds such as glycerols, may be employed as crosslinking agents. The amount of crosslinking agent employed will depend upon the monomers and the particular reaction method chosen, and will be readily determinable by those skilled in the art.

In another preferred embodiment, the methods of the present invention may also include molecular weight regulators for controlling the molecular weight of the resulting polyester polymer. Suitable molecular weight regulators are known to those skilled in the art, and include employing an excess of one monomer (i.e., either an excess of diol or an excess of diacid), or a monofunctional monomer capable of capping the polymer end chains, such as benzoic acid or phenol. The amount of molecular weight regulator employed is dependent upon the monomers and the particular reaction method chosen as well as the desired molecular weight, and will be readily determinable by those skilled in the art.

Yet another additive which may be incorporated into the processes of the present invention is an acid scavenger. Acid scavengers are useful for effectively removing evolved acids during the polymerization process. Suitable acid scavengers for use in polyesterification polymerization reactions are known in the art, and include, for example pyridine or triethyl amine and derivatives thereof. The amount of acid scavenger employed is dependent upon the monomers and the particular reaction method chosen, and will be readily determinable by those skilled in the art.

As will be appreciated by those skilled in the art, a wide variety of other additives such as antioxidants, dispersants, color improvers, whiteners, and the like may also be incorporated into the processes of the present invention. Specific examples of these additives and their utility are well known to those skilled in the art. Accordingly, the incorporation of these additives are contemplated by the present invention as well.

The polycondensation polymerization reactions according to the present invention may be carried out at a temperature ranging from about −50° C. up to about 500° C., depending upon the specific polymerization method employed. Typically the polycondensation reaction is carried out at a temperature of between about −20° C. and about 350° C. The reaction may be carried out at a pressure ranging from about 15 psi to about 45,000 psi, and is typically carried out at a pressure of between about 500 psi and about 10,000 psi. The polymerization is carried out for a period of time sufficient to achieve the desired molecular weight. Typically, the reaction mixture is allowed to polymerize for a period of from about 1 to about 24 hours.

The processes of the present invention may be carried out under conditions sufficient for the removal of the condensate from the reactor. More particularly, the processes of the present invention may be carried out in the presence of flowing carbon dioxide, which carries the condensate from the reactor. A surfactant may be employed in combination with flowing carbon dioxide to facilitate the removal of the condensate. Additionally, a surfactant may be employed which is capable of scavenging the condensate within the reactor without the necessity of removal by flowing carbon dioxide. These and other suitable techniques for the removal of the condensate are known in the art and contemplated by the present invention.

The polymerization can be carried out batchwise or continuously with thorough mixing of the reactants in any appropriately designed high pressure reaction vessel. To remove the heat evolved during the polymerization, advantageously the pressure apparatus includes a cooling system. Additional features of the pressure apparatus used in accordance with the invention include heating means such as an electric heating furnace to heat the reaction mixture to the desired temperature and mixing means, i.e., stirrers such as paddle stirrers, impeller stirrers, or multistage impulse countercurrent agitators, blades, and the like.

The polymerization can be carried out, for example, by feeding a mixture of monomer and polymerization medium and any desired polyesterification catalyst into a pressure apparatus. The reaction vessel is closed and the carbon dioxide is added. Thereafter, the reaction mixture is brought to the polymerization temperature and pressure. If desired, a cosolvent, and/or surfactant may be added to the reaction vessel with the monomer. Alternatively, only a portion of the reaction mixture may be introduced into an autoclave and heated to the polymerization temperature and pressure, with additional reaction mixture being pumped in at a rate corresponding to the rate of polymerization. In another possible procedure, some of the monomers are initially taken into the autoclave in the total amount of carbon dioxide and additional monomers or comonomers are pumped into the autoclave together at the rate corresponding to the rate of polymerization. As will be appreciated by those skilled in the art, the processes of the present invention may be carried out under conditions suitable for the removal of the evolving condensate. For example, the ethylene glycol condensate produced in the reaction of bishydroxyethyl terephthalate may be removed from the reaction vessel by using carbon dioxide under flowing conditions to yield polyethylene terephthalate. The ethylene glycol can be collected by a pressure let-down process or by an isobaric process using a method which washes the ethylene glycol from the carbon dioxide polymerization medium. As will be clear to those skilled in the art, the exact order of addition of the reactants is not critical, and those skilled in the art will appreciate that many methods of carrying out the present invention which manipulate the order of addition of the reactants are contemplated by the instant invention.

The present invention also contemplates a method of increasing the molecular weight of a polyester polymer using conventional solid state polymerization techniques but employing carbon dioxide polymerization medium in place of typically employed inert gaseous media. Methods of increasing the molecular weight of polyester polymers using solid state polymerization techniques are described in U.S. Pat. No. 4,348,593 to Duh and EP Publication No. 222 714 to Cobarr S.p.A., the disclosures of which are incorportated herein by reference in their entirety. Typically, preformed polyester pellets having an intrinsic viscosity of about 0.6 dl/g are treated in a reactor column such as a fixed bed or entrained bed reactor with heat in the presence of an inert solvent. Typically, the inert solvent is nitrogen, although supercritical carbon dioxide has also been employed as described in EP Publication No. 269 583, the disclosure of which is incorporated herein by reference. The polyester pellets are typically heated to a temperature which is above the glass transition temperature ($T_g$) of the polyester, but which is below the crystalline melt temperature ($T_m$) of the polyester. During the reaction, excess ethylene glycol is driven off, extending the polymeric chains, and thus producing a chain of higher molecular weight. The solid state reaction may be carried out in liquid, supercritical, or gaseous carbon dioxide, at temperature of between about 100° C. and about 200° C. and pressure in excess of 50 atm. For solid state polymerization in supercritical carbon dioxide, the pressure will typically be above the critical pressure of the polymerization medium, e.g., above 73 atm for carbon dioxide polymerization medium.

When the polycondensation polymerization is complete the polyester polymer may be separated from the reaction mixture. Any suitable means of separating the polyester from the reaction mixture may be employed. Typically, according to the process of the present invention, the polyester is separated from the reaction mixture by venting the polymerization medium to the atmosphere. Thereafter the polyester may be collected by physical isolation.

It may be desirable, for some applications to wash the resulting polyester prior to further processing. The polyester may be washed in wash fluids which are conventionally known in the art. According to one embodiment the wash fluid comprises carbon dioxide.

The polyesters produced according to the processes of the present invention are useful in a variety of conventionally known applications. For example, the polyesters may be used for the production of molded articles such as bottles, as fibers for clothing or other applications, or as powder coatings.

The following examples are provided to illustrate the present invention, and should not be construed as limiting thereof. In these examples, "psi" means pounds per square inch; "g" means grams; "mg" means milligrams; "ml" means milliliters; "g/mol" means grams per mole; "min." means minutes; "°C." means degrees Celsius and "wt. %" means percent by weight. The molecular weights are determined by GPC as described in each example.

EXAMPLE 1

Transesterification of Dimethylterephthalate and Ethylene Glycol

A 10 ml high pressure reactor with saphire windows is charged with 1.4 g (7.2 mmoles) of dimethyl terephthalate, 1 ml (1.113 g, 18 mmoles) of ethylene glycol, and 3 drops of concentrated sulfuric acid under flowing argon. After sealing, the reactor is heated to an internal temperature of 100° C. and charged with carbon dioxide at a pressure of 306 bar (4500 psi). The mixture consists of two phases. After 22 hours the pressure has increased to 333 bar (4900 psi). The reactor is vented and cooled to ambient temperature. A waxy material is obtained in quantitative yield, which according to GPC in THF, with polystyrene calibration, the solid consists of oligomers up to $\overline{M}_n$=660 g·mol$^{-1}$ .

EXAMPLE 2

Transesterification of Dimethyl Terephthalate and Ethylene Glycol

A 10 ml high pressure reactor with saphire windows is charged with 2.705 g (13.929 mmoles) of dimethyl terephthalate, 0.863 g (13.913 mmoles) of ethylene glycol and 3 drops of concentrated sulfuric acid under argon. After sealing, a temperature of 100° C. and a carbon dioxide-pressure of 353 bar (5200 psi) is maintained for 18 hours. After venting and cooling to ambient temperature, a waxy solid is obtained in quantitative yield. According to GPC in THF with polystyrene calibration, the solid consists of oligomers up to $\overline{M}_n$=470 g·mol$^{-1}$.

EXAMPLE 3

Transesterification of Bis(hydroxyethyl) terephthalate

A stirred 100 ml autoclave is charged with 36.5 g (143.6 mmoles) of bis(hydroxyethyl)terephthalate and 17.2 mg (0.06 mmoles) of $Sb_2O_3$. The reactor is flushed with gaseous carbon dioxide to remove oxygen and sealed. Thereafter the reactor is heated to an internal temperature of 180° C. within 1 hour while a carbon dioxide pressure of 163 bar (2400 psi) at a carbon dioxide flow rate of 45.5 g/hour (13 l(STP)/h) is maintained by means of a throttle valve. After 1 hour at 180° C., the temperature is raised to 200° C., and kept constant for 2.5 hours. Thereafter the temperature is raised to 240° C. and maintained for an additional 2 hours. Finally, the temperature is increased to 260° C. and maintained for ½ hour. During this procedure, pressure and carbon dioxide flow rate are maintained at their initial values. The yellow product obtained has a molar mass of $\overline{M}_n$=1460 g·mol$^{-1}$ (GPC in hexafluoroisopropanol, PET calibration).

The amount of ethylene glycol collected during the reaction is 1.35 g (21.7 mmoles), which corresponds to a conversion of 15%. Apparently, ethylene glycol is lost by evaporation during collection.

EXAMPLE 4

Transesterification of Bis(hydroxyethyl) terephthalate

A stirred 100 ml autoclave is charged with 43.5 g (171.1 mmoles) of bis(hydroxyethyl)terephthalate and 31 mg (0.1 mmoles) of $Sb_2O_3$. The reactor is flushed with gaseous carbon dioxide to remove oxygen and sealed. The reactor is heated to an internal temperature of 260° C. within 3 hours while a carbon dioxide pressure of 204 bar (3000 psi) at a carbon dioxide flow rate of 49 g/hour (14 l(STP)/h) is maintained by means of a throttle valve. This temperature is maintained for an additional 4 hours. During the reaction, pressure and carbon dioxide flow rate are maintained at their initial values. The yellow product obtained has a molar mass of $\overline{M}_n$=1690 g·mol$^{-1}$ (GPC in hexafluoroisopropanol, PET calibration).

The amount of ethylene glycol collected during the reaction is 3.27 g (52.71 mmoles), which corresponds to a conversion of 31%. Apparently, ethylene glycol is lost by evaporation during collection.

EXAMPLE 5

Transesterification of Bis(hydroxyethyl) terephthalate

A stirred 100 ml autoclave is charged with 40.5 g (159.3 mmoles) of bis(hydroxyethyl)terephthalate and 31.4 mg (0.1 mmoles) of $Sb_2O_3$. The reactor is flushed with gaseous carbon dioxide to remove oxygen and sealed. The reactor is heated to an Internal temperature of 280° C. within 3 hours while a carbon dioxide pressure of 190 bar (2800 psi) at a carbon dioxide flow rate of 45.5 g/hour (13 l(STP)/h) is maintained by means of a throttle valve. The temperature is maintained for an additional 2 hours. During the reaction, pressure and carbon dioxide flow rate are maintained at their initial values. The yellow product obtained has a molar mass of $\overline{M}_n$=2560 g·mol$^{-1}$ (GPC in hexafluoroisopropanol, PET calibration).

The amount of ethylene glycol collected during the reaction is 2.55 g (41.1 mmoles), which corresponds to a conversion of 26%. Apparently, ethylene glycol is lost by evaporation during collection.

EXAMPLE 6

Transesterification of Bis(hydroxyethyl) terephthalate

A stirred 100 ml autoclave is charged with 30.5 g (120 mmoles) of bis(hydroxyethyl)terephthalate, 47 mg (0.16 mmoles) of $Sb_2O_3$, and 10 drops of triethylphosphate. The reactor is flushed with gaseous carbon dioxide to remove oxygen and sealed. The reactor is heated to an internal temperature of 280° C. within 3.5 hours while a carbon dioxide pressure of 204 bar (2800 psi) at a carbon dioxide flow rate of 164.5 g/hour (47 l(STP)/h) is maintained by means of a throttle valve. The temperature is maintained for an additional 2.5 hours. During the reaction, pressure and carbon dioxide flow rate are maintained at their initial values. The white product obtained has a molar mass of $\overline{M}_n$=4680 g·mol$^{-1}$ (GPC in hexafluoroisopropanol, PET calibration).

The amount of ethylene glycol collected during the reaction is 4.3 g (69.3 mmoles), which corresponds to a conversion of 58%. Apparently, ethylene glycol is lost by evaporation during collection.

EXAMPLE 7

Transesterification of Bis(hydroxyethyl) terephthalate

A stirred 100 ml autoclave is charged with 46.2 g (181.7 mmoles) of bis(hydroxyethyl)terephthalate, 71 mg (0.24 mmoles) of $Sb_2O_3$, and 10 drops of triethylphosphate. The reactor is flushed with gaseous carbon dioxide to remove oxygen and sealed. The reactor is heated to an internal temperature of 280° C. within 2.5 hours while a carbon dioxide pressure of 190 bar (2800 psi) at a carbon dioxide flow rate of 248.5 g/hour (71 l(STP)/h) is maintained by means of a throttle valve. The temperature is maintained for an additional 3.5 hours. During the reaction, pressure and carbon dioxide flow rate are maintained at their initial values. The white product obtained has a molar mass of $\overline{M}_n$=6300 g·mol$^{-1}$ (GPC in hexafluoroisopropanol, PET calibration).

EXAMPLE 8

Crystallization of Amorphous Polyethylene Terephthalate Pellets

A tube-like reactor is charged with 15.1 g of amorphous polyethylene terephthalate pellets (diameter approximately 2 mm, intrinsic viscosity 0.585 dl/g, determined in hexafluoroisopropanol). The reactor is heated to 170° C. within 1 hour under a constant flow of carbon dioxide of 16.8 g/hour (4.8 l(STP)/h). The temperature and flow are maintained for an additional 1 hour.

EXAMPLE 9

Solid-State Condensation of Polyethylene Terephthalate

In a tube-like reactor the material obtained from Example 8 is heated to 210° C. within 1 hour under a constant flow of carbon dioxide of 260 g/hour (74.4 l(STP)/h). The temperature and flow are maintained for an additional 1 hour. The product obtained has an intrinsic viscosity of 0.621 dl/g (determined in hexafluoroisopropanol).

EXAMPLE 10

Polycondensation of Polyethylene Terephthalate

The procedure according to Example 7 is carried out with increased flow of carbon dioxide to obtain polyethylene terephthalate of high molar mass in continuation of the trend shown by Examples 6 and 7.

EXAMPLE 11

Transesterification of Dimethyl Terephthalate and Ethylene Glycol

The procedure according to Example 10 is carried out using dimethyl terephthalate and an excess of ethylene glycol as monomers with a manganese diacetate catalyst for the glycolysis in the first step, and a $Sb_2O_3$ or Ti(OBu)4 catalyst for the transesterification in the second step. A temperature of 180° C. is maintained for the replacement of methylester groups by hydroxyethylester groups. The methanol formed in the first step is removed by the carbon dioxide leaving the reactor in a continuous flow. After completion of the first step, the temperature is raised to 280° C. to remove excess ethylene glycol and start condensation by transesterification with expulsion of ethylene glycol. A high flow rate for carbon dioxide is maintained throughout the reaction (several hours) to remove ethylene glycol. M. Droscher, *Makromol. Chem.*, 181:789 (1980).

EXAMPLE 12

Copolyesters

The procedure according to Example 11 is carried out with the addition of 1–7 mole % of 1,4-butane diol, 1,3-propane diol, or 2,2-dimethyl-1,3-propane diol (neopentyl glycol) to obtain a rapidly crystallizing copolyester. See U.S. Pat. No. 4,136,089; German Patent No. 2,507,674; and *Chem. Abstr.*, 85:160857t (1976).

EXAMPLE 13

Copolyesters

The procedure according to Example 11 is carried out with the addition of isophthalic acid, sebacic acid, and neopentyl glycol to obtain high molar mass copolyesters suitable for protective coatings for sterilizable apparatus. See German Patent No. 1,807,776; and *Chem. Abstr.*, 73:36664r (1970).

EXAMPLE 14

Segmented Thermoplastic Poly(ester-ether)-Elastomers

The procedure according to Example 11 is carried out with dimethyl terephthalate, 1,4-butane diol, and α,w- dihydroxy-poly(tetramethylene glycol) as monomers. See German Patent No. 2,213,128; and *Chem. Abstr.,* 78:17337y (1973).

EXAMPLE 15

Polyesters Containing 1,4-Cyclohexane Dimethanol

The procedure according to Example 11 is carried out with dimethyl terephthalate and 1,4-cyclohexane dimethanol as monomers. Additionally, part of the cyclic diol can be replaced by a linear diol. See U.S. Patent No. 2,901,466; and *Chem. Abstr.,* 54:1926a (1960).

EXAMPLE 16

Branched Copolyesters

The procedure according to Example 11 is carried out with dimethyl sebacate, ethylene glycol, and 1–5 mole % of glycerol as monomers to obtain an aliphatic, branched copolyester for use in crosslinked polyurethanes.

EXAMPLE 17

Polyesters By Melt Acidolysis

The procedure according to Example 11 is carried out with hydroquinone diacetate, terephthalic acid, and 4-acetoxybenzoic acid as monomers. The polymer forming reaction is the melt acidolysis of the acetate groups by the acid groups. Acetic acid is formed as a by-product, which is removed by the continuous flow of carbon dioxide. Thus, a thermotropic liquid crystalline copolyester is obtained. See J-1. Jin, et al., *Brit. Polym. J.* 12:132 (1980).

EXAMPLE 18

Polycondensation in the Presence of Surfactant

The procedure according to Example 11 is carried out with the addition of 1–10% by weight of a carbon dioxide-active surfactant such as poly(1H,1H-perfluorooctylacrylate-co-acrylic acid) which reduces the surface tension and allows easy dispersion of the polymer melt in the carbon dioxide phase.

EXAMPLE 19

Polycondensation in the Presence of Surfactant

The procedure according to Example 18 is carried out with a graft- or blockcopolymer as surfactant. The graft- and blockcopolymers are any of PMMA- or polystyrene backbone polymers with poly(dimethylsiloxane) grafts, PMMA- or polystyrene backbone polymers with PFOA grafts, PMMA- or polystyrene backbone polymers with poly(perfluoroalkylether) grafts, poly(styrene-block-1H,1H-perfluorooctylacrylate), and poly(styrene-block-dimethylsiloxane).

EXAMPLE 20

Interfacial Acid-halide Polycondensation

A carbon dioxide-soluble acid chloride (such as sebacic acid dichloride) is dissolved in liquid or supercritical carbon dioxide. An aqueous solution of a bisphenol and a strong base, such as sodium hydroxide (to form the bisphenoxide) is added under vigorous agitation. The bisphenoxide is insoluble in carbon dioxide, and the reaction takes place at the interface to form high molar mass polymer. The reaction avoids the use of toxic and environmentally unacceptable solvents such as chlorinated hydrocarbons, which are commonly used in related processes to dissolve the diacid chloride. See P. W. Morgan, "Condensation Polymers: By Interfacial and Solution Methods", Wiley Interscience, New York 1965.

The foregoing is illustrative of the present invention and is not to be construed as limiting thereof. The invention is defined by the following claims, with equivalents of the claims to be included therein.

That which is claimed is:

1. A process for making polyester polymers comprising:
   (1) providing a carbon dioxide polymerization medium;
   (2) contacting a monomer capable of forming a polyester polymer with said carbon dioxide polymerization medium to form a polymerization reaction mixture comprising said monomer and said carbon dioxide polymerization medium;
   (3) pressurizing said polymerization reaction mixture to a pressure between about 500 psi and about 45,000 psi; and
   (4) polymerizing said monomer in said pressurized polymerization reaction mixture in the presence of a polyesterification catalyst selected from the group consisting of a protonic acid, a Lewis acid, and mixtures thereof.

2. The process according to claim 1, wherein said monomer comprises a hydroxycarboxylic acid monomer.

3. The process according to claim 1, wherein said monomer comprises a mixture of dicarboxylic acid monomer and diol monomer.

4. The process according to claim 1, wherein said polymerization medium comprises liquid carbon dioxide.

5. The process according to claim 1, wherein said polymerization medium comprises supercritical carbon dioxide.

6. The process according to claim 1, wherein said polymerization medium comprises gaseous carbon dioxide.

7. The process according to claim 1, carried out in the presence of a polyesterification catalyst.

8. The process according to claim 1, wherein said step (c) of polymerizing comprises direct esterification polymerization.

9. The process according to claim 1, wherein said step (c) of polymerizing comprises transesterification polymerization.

10. The process according to claim 1, wherein said step (c) of polymerizing comprises melt acidolysis polymerization.

11. The process according to claim 1, wherein said step 9c) of polymerizing comprises acid halide polymerization.

12. The process according to claim 1, said step (b) further comprising contacting a comonomer with said monomer, and said polymerization comprising contacting a comonomer with said monomer and said polymerization medium, and said step (c) of polymerizing comprises copolymerizing said monomer with said comonomer.

13. The process according to claim 1, wherein said polymerization medium further comprises a cosolvent.

14. The process according to claim 1, wherein said cosolvent is selected from the group consisting of $C_2$–$C_8$ alkenes, $C_2$–$C_8$ alkenes, $C_2$–$C_8$ ethers, methylene chloride, toluene, cyclohexane, methylethyl ketone, acetone, tetrahydrofuran, perfluorocarbons, and hydrofluorocarbons.

15. The process according to claim 1, wherein said process is carried out in the presence of a surfactant.

16. The process according to claim 14, wherein said surfactant comprises a carbon dioxide soluble segment.

17. The process according to claim 1, wherein said process is carried out in the presence of a crosslinking agent.

18. The process according to claim 1, wherein said process is carried out in the presence of a molecular weight regulator.

19. The process according to claim 1, wherein said process is carried out in the presence of coloring agents.

20. The process according to claim 1, further comprising the steps of separating said polyester polymer from said polymerization medium, and collecting said polyester polymer.

21. The process according to claim 20, wherein said step of separating said polyester polymer comprises venting said polymerization medium to the atmosphere.

22. The process according to claim 20, further comprising the step of washing the polymer with a wash fluid comprising carbon dioxide, prior to said step of collecting said polyester polymer.

23. The process according to claim 1, wherein the polyesterification catalyst is a protonic acid selected from the group consisting of sulfuric acid, hydrochloric acid, p-toluene sulphonic acid, and mixtures thereof.

24. The process according to claim 1, wherein the polyesterifcation catalyst is a Lewis acid selected from the group consisting of a titanium alkoxide, a dialkyltin(IV) oxide, a weak base, antimony trioxide, a bimetallic alkoxide, and mixtures thereof.

25. The process according to claim 24, wherein the polyesterification catalyst is antimony trioxide.

26. The process according to claim 24, wherein the polyesterification catalyst is a titanium alkoxide.

27. The process according to claim 26, wherein the titanium alkoxide is $Ti(OC_4H_9)_4$.

28. The process according to claim 24, wherein the polyesterification catalyst is a bimetallic alkoxide selected from the group consisting of $NaHTi(OC_4H_9)_6$, $NaHTi(OC_4H_9)_6$, and mixtures thereof.

* * * * *

UNITED STATES PATENT AND TRADEMARK OFFICE
CERTIFICATE OF CORRECTION

PATENT NO. : 5,977,292  
DATED : November 2, 1999  
INVENTOR(S) : DeSimone et al.

Page 1 of 1

It is certified that error appears in the above-identified patent and that said Letters Patent is hereby corrected as shown below:

Column 1,  
Before FIELD OF THE INVENTION insert the following paragraph:  
-- This invention was made with Government support under Grant No. DMR935-0334 awarded by the National Science Foundation. The government has certain rights to this intvention. --

Column 17, claim 16,  
Line 1, "claim 14" should read -- claim 15 --.

Signed and Sealed this

Twentieth Day of November, 2001

Attest:

*Nicholas P. Godici*

NICHOLAS P. GODICI  
*Attesting Officer*     *Acting Director of the United States Patent and Trademark Office*